US012729892B2

(12) United States Patent
Kim et al.

(10) Patent No.: US 12,729,892 B2
(45) Date of Patent: Sep. 8, 2026

(54) VALVE ASSEMBLY AND A HEAT PUMP SYSTEM INCLUDING THE SAME

(71) Applicants: HYUNDAI MOTOR COMPANY, Seoul (KR); KIA CORPORATION, Seoul (KR); HYUNDAI WIA CORPORATION, Changwon-si (KR); DONG IL MACHINERY CO., LTD., Anseong-si (KR)

(72) Inventors: Yeonho Kim, Hwaseong-si (KR); Jae Yeon Kim, Hwaseong-si (KR); Jeawan Kim, Hwaseong-si (KR); Jong Il Park, Hwaseong-si (KR); Yong Han Lee, Hwaseong-si (KR); Namho Park, Hwaseong-si (KR); Jun Ho Kim, Uiwang-si (KR); Hyung Seob Kim, Uiwang-si (KR); Younhan Kim, Uiwang-si (KR); Jang Sik Park, Yongin-si (KR); Tae Ho Hong, Yongin-si (KR); Seong Hwan Kim, Yongin-si (KR); Deok Soo Han, Yongin-si (KR); Bu yong Choi, Yongin-si (KR)

(73) Assignees: HYUNDAI MOTOR COMPANY, Seoul (KR); KIA CORPORATION, Seoul (KR); HYUNDAI WIA CORPORATION, Changwon-si (KR); DONG IL MACHINERY CO., LTD., Anseong-si (KR)

( * ) Notice: Subject to any disclaimer, the term of this patent is extended or adjusted under 35 U.S.C. 154(b) by 4 days.

(21) Appl. No.: 18/965,373

(22) Filed: Dec. 2, 2024

(65) Prior Publication Data

US 2026/0071794 A1 Mar. 12, 2026

(30) Foreign Application Priority Data

Sep. 10, 2024 (KR) ........................ 10-2024-0123176

(51) Int. Cl.
*F25B 41/31* (2021.01)
*F16K 5/12* (2006.01)
(Continued)

(52) U.S. Cl.
CPC ................ *F25B 41/31* (2021.01); *F16K 5/12* (2013.01); *F16K 11/0876* (2013.01); *F25B 30/00* (2013.01); *F25B 41/40* (2021.01)

(58) Field of Classification Search
CPC ...... F25B 41/31; F25B 41/40; F16K 11/0876; F16K 5/10; F16K 5/12
See application file for complete search history.

(56) References Cited

U.S. PATENT DOCUMENTS 7,694,693 B1 * 4/2010 Edelman .................. A61F 7/02 137/625.3
11,724,561 B2 * 8/2023 Spies ................ B60H 1/00485 137/625

(Continued)

*Primary Examiner* — Michael R Reid
(74) *Attorney, Agent, or Firm* — Lempia Summerfield Katz LLC

(57) ABSTRACT

A valve assembly includes: a valve housing including an inlet port, and a first outlet port to a third outlet port. The first, second and third outlet ports are formed along a circumference of the valve housing. The valve assembly further includes: a valve body rotatably provided inside the valve housing and including a body inlet, a body outlet fluidly connected to the body inlet, and a first expansion groove and a second expansion groove that are formed adjacent to the body outlet. The body inlet and the inlet port are fluidly connected at all times, and the body outlet is selectively and fluidly connected simultaneously to two outlet ports, among the first outlet port to the third outlet port, through the first expansion groove and the second expansion groove as the valve body rotates.

20 Claims, 12 Drawing Sheets

(51) Int. Cl.
*F16K 11/087* (2006.01)
*F25B 30/00* (2006.01)
*F25B 41/40* (2021.01)

(56) References Cited

U.S. PATENT DOCUMENTS

| | | | | |
|---|---|---|---|---|
| 11,781,657 | B2 * | 10/2023 | Zens | B60H 1/00485 251/315.16 |
| 11,898,644 | B2 * | 2/2024 | Cook | E21B 43/2607 |
| 12,247,769 | B2 * | 3/2025 | Kim | F16K 11/0876 |

* cited by examiner

VALVE ASSEMBLY AND A HEAT PUMP SYSTEM INCLUDING THE SAME

CROSS-REFERENCE TO RELATED APPLICATION

This application claims priority to and the benefit of Korean Patent Application No. 10-2024-0123176 filed in the Korean Intellectual Property Office on Sep. 10, 2024, the entire contents of which are incorporated herein by reference.

BACKGROUND

(a) Field

The disclosure relates to a valve assembly and a heat pump system including the same, and more particularly, to a valve assembly capable of simultaneously implementing a function of an expansion valve in two directions and a heat pump system including the same.

(b) Description of the Related Art

In general, an air conditioning system for a vehicle includes an air conditioning device for circulating refrigerant to heat or cool an interior of the vehicle.

Such an air conditioning device is to maintain a comfortable internal environment by keeping a temperature of the interior of the vehicle at an appropriate temperature regardless of a temperature change of the outside. The air conditioning device is configured to heat or cool the interior of the vehicle by exchanging heat using an evaporator while the refrigerant discharged from a compressor passes through a condenser, a receiver drier, an expansion valve, and the evaporator, and circulates back to the compressor.

In other words, in the air conditioning device, during a cooling mode in summer, high-temperature and high-pressure gaseous refrigerant compressed by the compressor is condensed through the condenser, then passes through the receiver drier and the expansion valve, and is evaporated in the evaporator, thereby lowering a temperature and humidity of the interior.

In recent years, in response to growing interest in energy efficiency and environmental concerns, environmentally friendly vehicles capable of significantly replacing internal combustion engine vehicles have been developed. Such environmentally friendly vehicles are usually classified into electric vehicles, which are driven by electric power of a battery as a power source, and hybrid vehicles, which are driven by an engine and a battery.

Among the environmentally friendly vehicles, the electric vehicle does not use a separate heater, unlike an air conditioner of an internal combustion engine vehicle, and an air conditioner applied to the electric vehicle is generally referred to as a heat pump system.

In the case of electric vehicles, a plurality of heat exchangers (condensers, evaporators, and/or the like) are applied for interior air conditioning, battery cooling, and/or drive motor cooling, and a plurality of expansion valves are required to supply expanded refrigerant to the heat exchangers.

Applying the plurality of expansion valves to the heat pump system complicates the configuration of the entire system and increases manufacturing costs.

The matters described in the background art section are prepared to enhance understanding of the background of the present disclosure, and may include matters that have not been known to those having ordinary skill in the art to which the present technology belongs.

SUMMARY

The present disclosure provides a valve assembly capable of simultaneously controlling a plurality of heat exchangers through a plurality of outlet ports through which refrigerant can be expanded, and a heat pump system including the same.

In addition, the present disclosure attempts to simplify a structure of a heat pump system and reduce manufacturing costs.

According to an embodiment of the present disclosure, a valve assembly includes: a valve housing that includes an inlet port, and a first outlet port to a third outlet port that are formed along a circumference; and a valve body rotatably provided inside the valve housing. The valve body includes a body inlet, a body outlet fluidly connected to the body inlet, and a first expansion groove and a second expansion groove formed adjacent to the body outlet. In particular, the body inlet and the inlet port are fluidly connected at all times, and the body outlet is selectively and fluidly connected to at least one of the first outlet port, the second outlet port or the third outlet port. The body outlet is selectively and fluidly connected simultaneously to two outlet ports, among the first outlet port, the second outlet port and the third outlet port, through the first expansion groove and the second expansion groove as the valve body rotates.

In some embodiments, a shortest circumferential distance between the first expansion groove and the second expansion groove may be longer than a shortest circumferential distance between a pair of adjacent outlet ports among the first outlet port to the third outlet port.

In some embodiments, the first expansion groove and the second expansion groove may have different shapes from each other.

In some embodiments, any one of lengths, widths, or depth gradients of the first expansion groove and the second expansion groove may be formed differently from each other.

In some embodiments, the first expansion groove and the second expansion groove may have the same shape.

In some embodiments, the lengths, widths, and depth gradients of the first expansion groove and the second expansion groove may be formed to be the same as each other.

In some embodiments, the body outlet may be formed at a position perpendicular to the body inlet.

In some embodiments, the valve body may be formed in a spherical shape, and a connecting flow passage configured to fluidly connect the body inlet and the body outlet may be formed inside the valve body.

In some embodiments, the first outlet port to the third outlet port may be formed at equal intervals along the circumference of the valve housing.

In some embodiments, a distance between any one pair of adjacent outlet ports, among the first outlet port to the third outlet port, may be shorter than a distance between each of the other two pairs of the outlet ports.

In some embodiments, the valve assembly may further include valve seats each provided between the valve body and one of the first outlet port, the second outlet port and the third outlet port of the valve housing. The valve seats are configured to rotatably support the valve body. The valve assembly further includes a valve support body provided on a radially outer side of each of the valve seats.

In some embodiments, the valve assembly may further include a valve seal provided between each of the valve seats and the valve support body.

According to an embodiment, a heat pump system includes: a valve housing including an inlet port, and a first outlet port to a third outlet port that are formed along a circumferential direction of the valve housing; and a valve body rotatably accommodated inside the valve housing. The valve body includes: a body inlet connected to the inlet port at all times, a body outlet selectively connected to at least one of the first outlet port, the second outlet port or the third outlet port, and a first expansion groove and a second expansion groove that are formed adjacent to the body outlet. The heat pump system further includes: a refrigerant inflow line fluidly connected to the inlet port of the valve housing; and a plurality of refrigerant discharge lines fluidly connected to at least one of the first outlet port, the second outlet port or the third outlet port of the valve housing. The plurality of refrigerant discharge lines include a first refrigerant discharge line, a second refrigerant discharge line and a third refrigerant discharge line. The body inlet and the inlet port are fluidly connected to the refrigerant inflow line at all times. The body outlet is selectively and fluidly connected to at least one of: i) the first outlet port and the first refrigerant discharge line, ii) the second outlet port and the second refrigerant discharge line, or iii) the third outlet port and the third refrigerant discharge line.

In some embodiments, at least one of a first mode, a second mode, a third mode or a fourth mode may be selectively operated as the valve body rotates. The first mode may be a mode in which refrigerant flowing into the refrigerant inlet line is discharged to the first refrigerant discharge line, the second mode may be a mode in which refrigerant flowing into the refrigerant inlet line is discharged to the second refrigerant discharge line, the third mode may be a mode in which refrigerant flowing into the refrigerant inlet line is expanded and discharged to the second refrigerant discharge line and the third refrigerant discharge line, and the fourth mode may be a mode in which refrigerant flowing into the refrigerant inlet line is discharged to the third refrigerant discharge line.

In some embodiments, the valve body is positioned at a reference position in the first mode, the valve body is rotated by a first set angle in a set direction from the reference position in the second mode, the valve body is rotated by a second set angle in the set direction from the reference position in the third mode, and the valve body is rotated by a third set angle in the set direction from the reference position in the fourth mode.

In some embodiments, the second set angle may be greater than the first set angle, and the third set angle may be greater than the second set angle.

In some embodiments, in the first mode, the refrigerant inflow line may be fluidly connected to the first refrigerant discharge line through the inlet port, the body inlet, the body outlet, and the first outlet port, and the refrigerant flowing in through the refrigerant inflow line may be discharged to the first refrigerant discharge line.

In some embodiments, in the second mode, the refrigerant inflow line may be fluidly connected to the second refrigerant discharge line through the inlet port, the body inlet, the body outlet, and the second outlet port, and the refrigerant flowing in through the refrigerant inflow line may be discharged to the second refrigerant discharge line.

In some embodiments, in the third mode, the refrigerant inflow line may be fluidly connected to the second refrigerant discharge line through the inlet port, the body inlet, the body outlet, the first expansion groove, and the second outlet port, the refrigerant inflow line may be fluidly connected to the third refrigerant discharge line through the inlet port, the body inlet, the body outlet, the second expansion groove, and the third outlet port, a portion of the refrigerant flowing in through the inflow line may be expanded through the first expansion groove and discharged to the second refrigerant discharge line through the second outlet port, and the remaining refrigerant flowing in through the inflow line may be expanded through the second expansion groove and discharged to the third refrigerant discharge line through the third outlet port.

In some embodiments, in the fourth mode, the refrigerant inflow line may be fluidly connected to the third refrigerant discharge line through the inlet port, the body inlet, the body outlet, and the third outlet port, and the refrigerant flowing in through the refrigerant inflow line may be discharged to the third refrigerant discharge line.

According to the embodiments, it is possible to implement the functions of two expansion valves through a single valve assembly, thereby simplifying the structure of a heat pump system to which the valve assembly is applied and reducing the manufacturing cost.

In addition, the effects that can be obtained or expected by the embodiments of the present disclosure should be directly or implicitly disclosed in the detailed description of the embodiments of the present disclosure. Various effects that may be expected by the embodiments of the present disclosure should be disclosed in the detailed description described below.

BRIEF DESCRIPTION OF THE DRAWINGS

Since the accompanying drawings are for reference in describing embodiments of the present disclosure, the technical spirit of the present disclosure should not be construed as being limited to the accompanying drawings.

Figure 1:
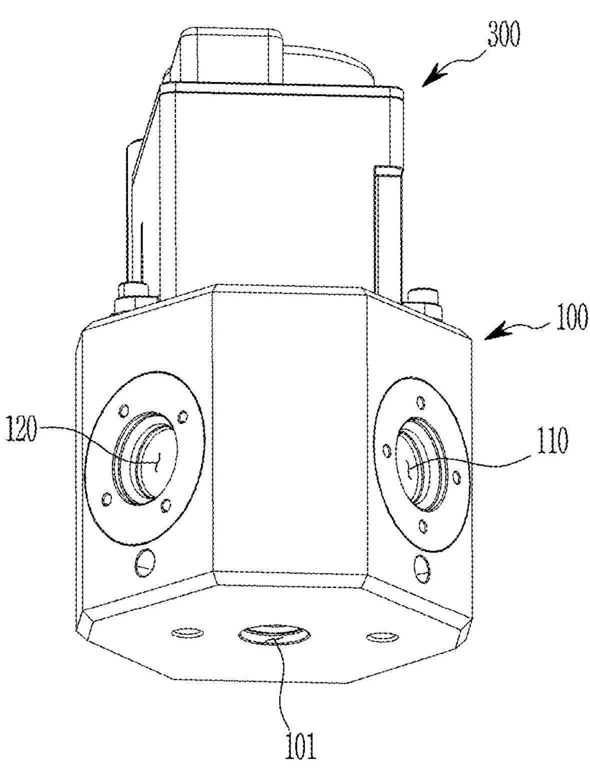
FIGS. 1 and 2 are perspective views illustrating a configuration of a valve assembly according to an embodiment.

It should be understood that the above-referenced drawings are not necessarily drawn to scale, and present rather simplified representations of various features illustrating the basic principles of the present disclosure. The specific design features of the present disclosure, including, for example, specific dimensions, orientations, locations, and shapes, should be determined in part by the specific intended application and use environment.

DETAILED DESCRIPTION

The terminology used herein is for the purpose of describing specific embodiments only and is not intended to limit the present disclosure. As used herein, the singular forms are intended to include the plural forms as well, unless the context clearly indicates otherwise. It should be further understood that the terms "comprises" and/or "comprising", when used in the present disclosure, specify the presence of stated features, integers, steps, operations, constitutional elements, and/or components, but do not preclude the presence or addition of one or more other features, integers, steps, operations, constitutional elements, components, and/or groups thereof. As used herein, the term "and/or" includes any one or all combinations of the associated listed items.

When a component, device, element, or the like of the present disclosure is described as having a purpose or performing an operation, function, or the like, the component, device, or element should be considered herein as being "configured to" meet that purpose or to perform that operation or function.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

In the following detailed description, only certain embodiments of the present disclosure have been shown and described, simply by way of illustration. However, the present disclosure can be variously implemented and is not limited to the following embodiments.

The drawings and description are to be regarded as illustrative in nature and not restrictive. Like reference numerals designate like elements throughout the present disclosure.

In addition, the size and thickness of each configuration shown in the drawings are arbitrarily shown for understanding and ease of description, but the present disclosure is not limited thereto. In the drawings, the thickness of portions, films, panels, regions, etc., are exaggerated for clarity.

The suffixes "module" and/or "unit" or "part" for constitutional elements used in the following description are given or used interchangeably only for ease of writing the specification, and thus do not themselves have distinct meanings or roles.

In addition, in describing an embodiment disclosed, a detailed description of related known technologies has been omitted if it is determined that the detailed description makes the gist of the embodiment of the present disclosure unclear.

Further, the accompanying drawings are provided for helping to easily understand embodiments disclosed in the present disclosure, and the technical spirit disclosed in the present disclosure is not limited by the accompanying drawings, and it should be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms.

In the following description, expressions described in singular can be interpreted as singular or plural unless explicit expressions such as "one" or "single" are used.

The terms are used only to discriminate one constituent element from another constituent element.

Hereinafter, a valve assembly according to an embodiment is described in detail with reference to the accompanying drawings.

Figure 2:
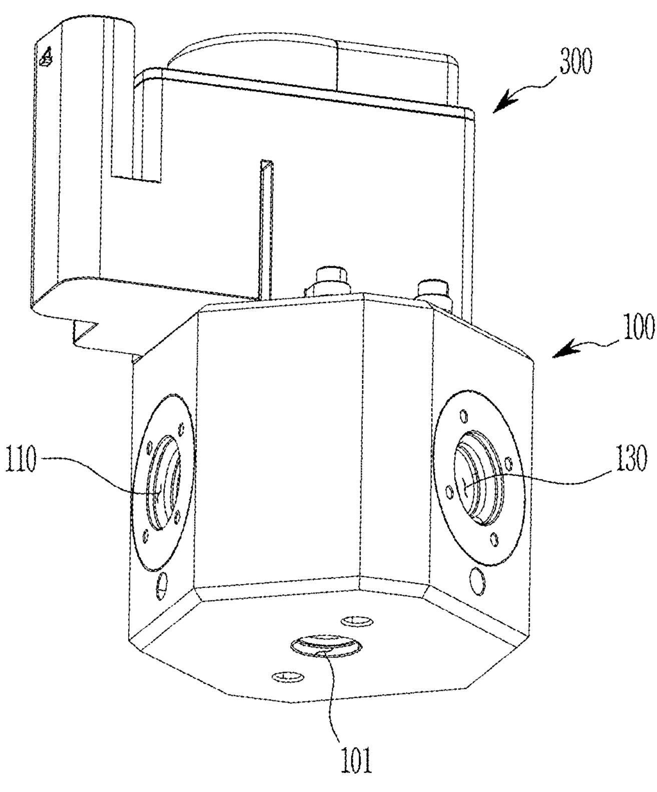
Figure 3:
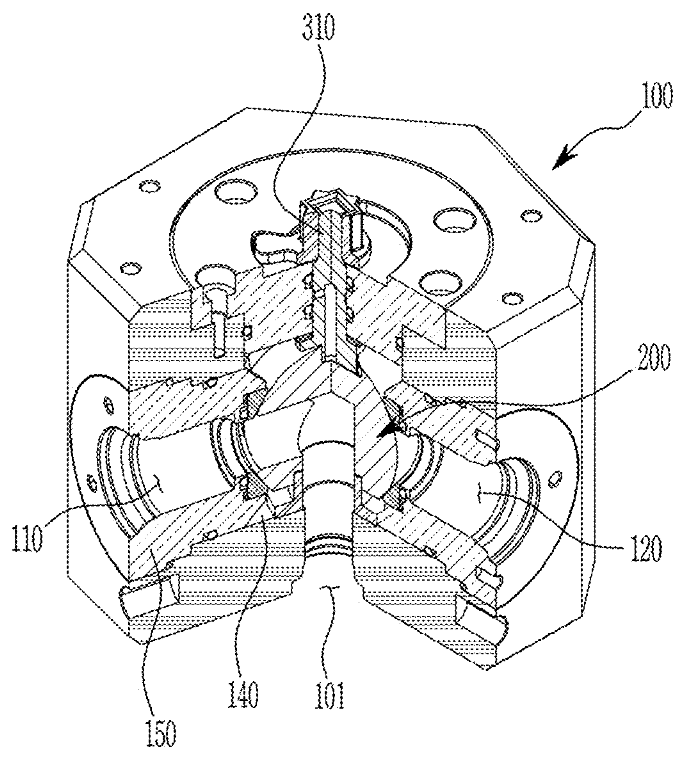
FIG. 3 is a partial cutaway perspective view illustrating the configuration of the valve assembly according to the embodiment.
Figure 4:
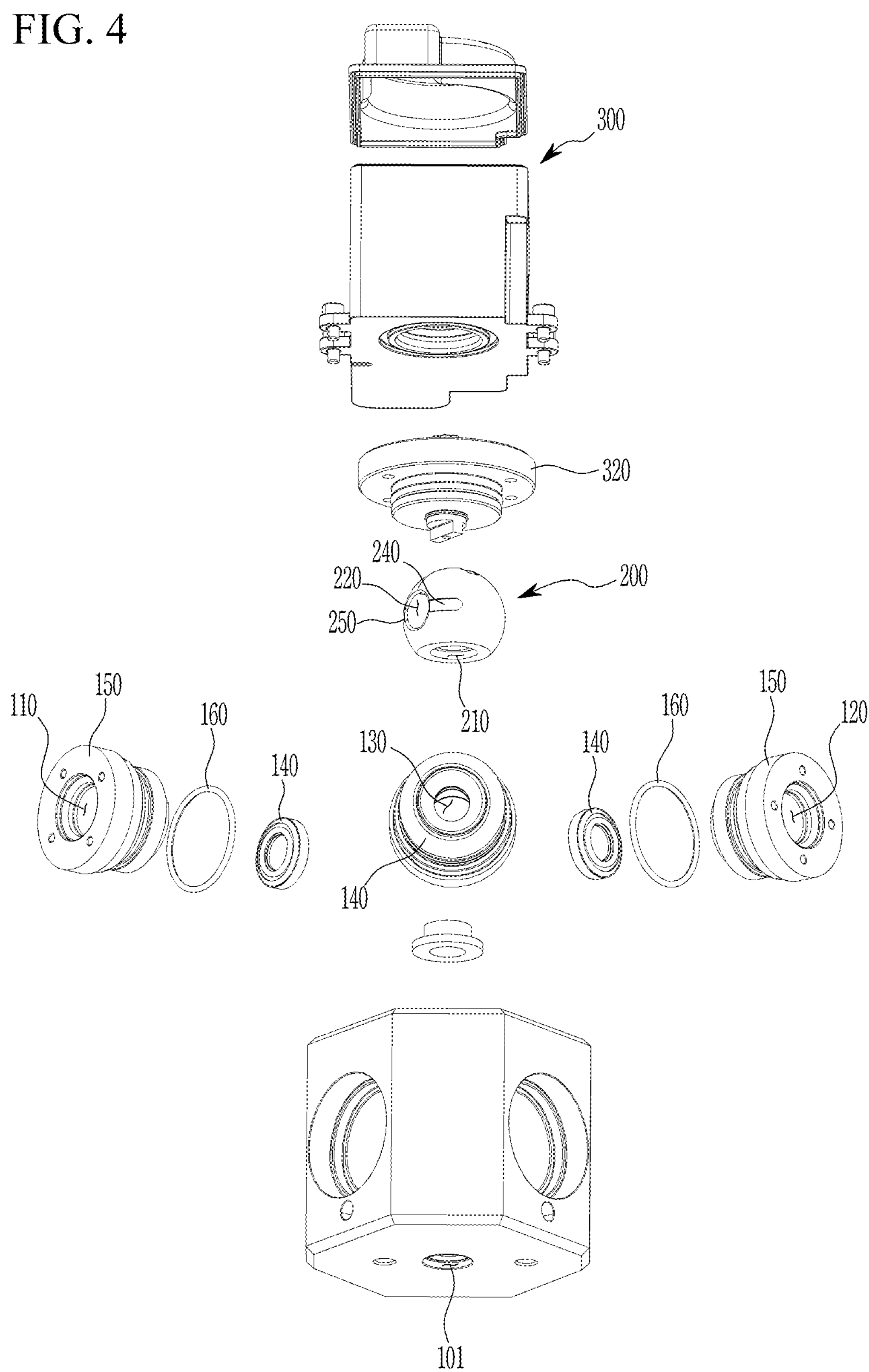
FIG. 4 is an exploded perspective view of the valve assembly according to the embodiment.

FIGS. 1 and 2 are perspective views illustrating a configuration of a valve assembly according to an embodiment. FIG. 3 is a partial cutaway perspective view illustrating the configuration of the valve assembly according to the embodiment. FIG. 4 is an exploded perspective view of the valve assembly according to the embodiment.

According to an embodiment, as illustrated in FIGS. 1 to 4, a valve assembly may include a valve housing 100 in which an inlet port 101 and a plurality of outlet ports are formed, and a valve body 200 formed in a spherical shape and rotatably provided inside the valve housing 100.

The valve housing 100 may have a mounting space formed to accommodate the valve body 200, the inlet port 101 formed at a bottom, and the plurality of outlet ports formed along a circumference of the valve housing 100.

A drive unit 300 that generates power for operating a valve may be installed on an upper part of the valve housing 100. The drive unit 300 may be implemented with an electric motor, a hydraulic motor, or a solenoid.

A drive bracket 320 for fastening the drive unit 300 may be provided at the valve housing 100, and the drive unit 300 may be fastened to the valve housing 100 through the drive bracket 320.

The plurality of outlet ports may include a first outlet port 110, a second outlet port 120, and a third outlet port 130, which are formed at equal intervals along the circumference of the valve housing 100. For example, the first outlet port 110 to the third outlet port 130 may be formed at 120 degree intervals along the circumference of the valve housing 100.

In one embodiment, a circumferential distance between a pair of adjacent outlet ports (e.g., the second outlet port 120 and the third outlet port 130), among the first outlet port 110 to the third outlet port 130, may be shorter than a distance between each of the other two pairs of the outlet ports (e.g., a circumferential distance between the first outlet port and the second outlet port, and a circumferential distance between the first outlet port and the third outlet port).

By forming the circumferential distance between the second outlet port 120 and the third outlet port 130 to be shorter than the distance between each of the other two pairs of outlet ports, refrigerant can be easily discharged through the second outlet port 120 and the third outlet port 130 while expanding through a first expansion groove 240 and a second expansion groove 250 described below.

Figure 5:
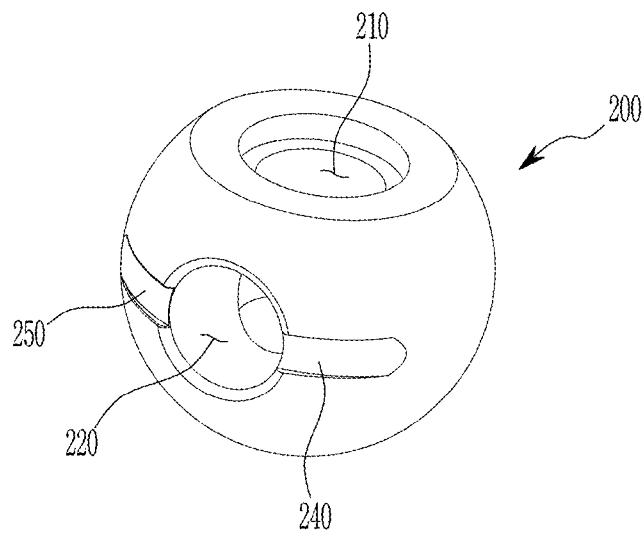
FIGS. 5 and 6 are perspective views illustrating configurations of a valve body according to the embodiment.
Figure 6:
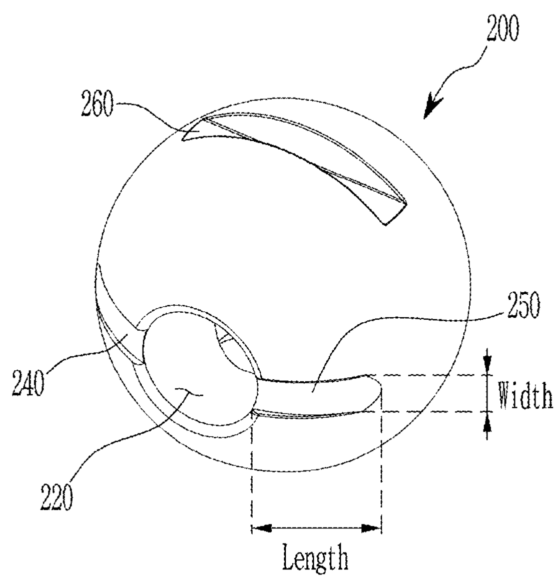
Figure 7:
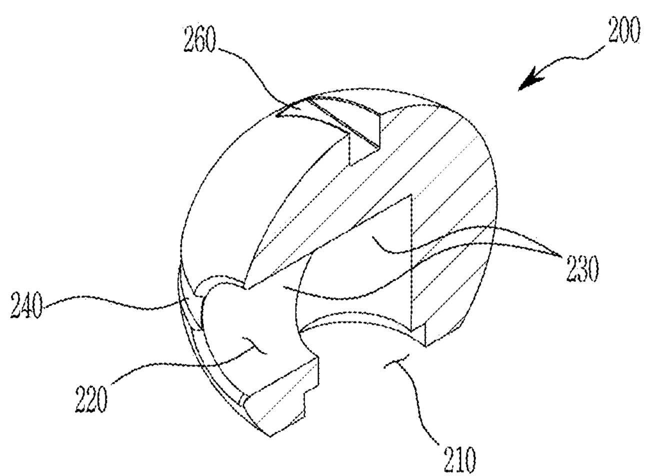
FIG. 7 is a cutaway perspective view illustrating the configuration of the valve body according to the embodiment.
Figure 8:
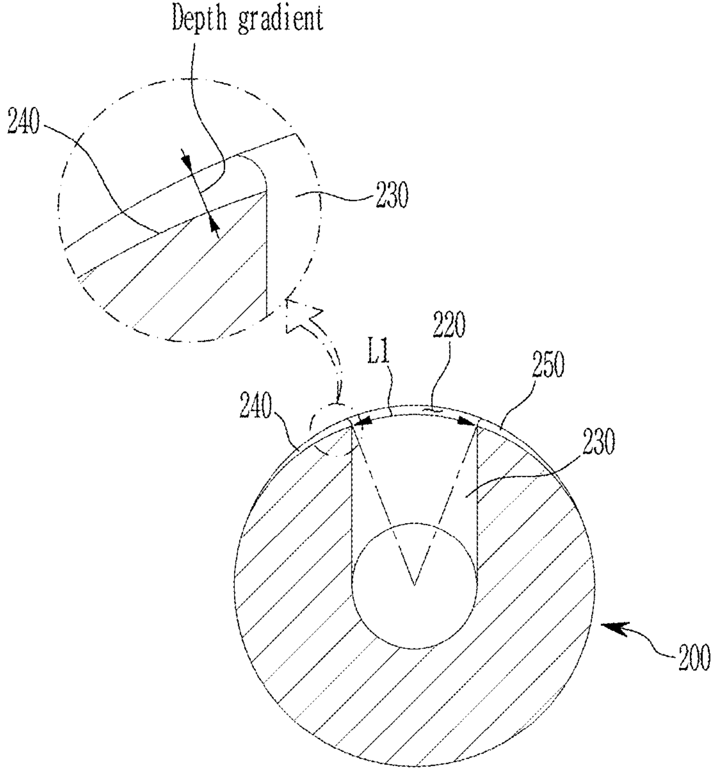
FIG. 8 is a cross-sectional view illustrating the configuration of the valve body according to the embodiment.

FIGS. 5 and 6 are perspective views illustrating configurations of a valve body according to the embodiment. FIG. 7 is a cutaway perspective view illustrating the configuration of the valve body according to the embodiment. FIG. 8 is a cross-sectional view illustrating the configuration of the valve body according to the embodiment.

Referring to FIGS. 5 to 8, the valve body 200 may be rotatably mounted in the mounting space of the valve housing 100, may be fluidly connected to the inlet port 101 of the valve housing 100 at all times, and may be selectively and fluidly connected to the plurality of outlet ports of the valve housing 100.

The valve body 200 may be formed in a substantially spherical shape and may include a body inlet 210 through which a working fluid flows in, a body outlet 220 fluidly connected to the body inlet 210 and through which the working fluid is discharged, and a first expansion groove 240 and a second expansion groove 250 formed adjacent to the body outlet 220 and through which the working fluid is expanded.

The body inlet 210 may be formed in an upper center of the valve body 200, and the working fluid may flow into the valve body 200 through the body inlet 210.

A connecting flow passage 230 formed in a substantially "L" shape may be formed inside the valve body 200. The body inlet 210 and the body outlet 220 may be fluidly connected through the connecting flow passage 230.

An axial groove 260 is formed at a bottom of the valve body 200. The axial groove 260 may be coupled to a drive shaft 310 of the drive unit 300.

The body outlet 220 may be fluidly connected to the body inlet 210 through the connecting flow passage 230 and may be formed at a side center of the valve body 200. In other words, the body outlet 220 may be formed perpendicular to the body inlet 210.

The first expansion groove 240 and the second expansion groove 250 may be formed adjacent to the body outlet 220 and may perform a function of expanding the working fluid discharged through the body outlet 220.

The first expansion groove 240 and the second expansion groove 250 may have a length corresponding to an angle set along a rotational direction of the valve body 200, a width set in a direction perpendicular to the rotational direction of the valve body 200, and a depth gradient set along the length of each of the expansion grooves 240 and 250.

In an embodiment, the depth gradient of each of the first and second expansion grooves 250 may refer to a change in depth in a direction perpendicular to a longitudinal direction of each of the first and second expansion grooves 250 (referred to as a "depth direction" as needed) when each of the first and second expansion grooves 250 is formed with a length corresponding to an angle set along the rotational direction of the valve body 200.

A large depth gradient may indicate that each of the first and second expansion grooves 250 is formed to deepen rapidly, while a small depth gradient may indicate that each of the first and second expansion grooves 250 is formed to deepen gradually.

In other words, each of the first expansion groove 240 and the second expansion groove 250 may be formed to have a set length, a set width, and a set depth gradient.

The first expansion groove 240 and the second expansion groove 250 may be formed to face each other with respect to the body outlet 220.

The first expansion groove 240 and the second expansion groove 250 may be arranged to face each other with respect to the body outlet 220. In this case, the first expansion groove 240 and the second expansion groove 250 may be formed asymmetrically along the circumferential direction of the valve body 200 with respect to the body outlet 220. For example, at least one of the length, width, or depth gradient of the first expansion groove 240 may be formed differently from those (i.e., at least one of the length, width, or depth gradient) of the second expansion groove 250. By forming the first expansion groove 240 and the second expansion groove 250 in different shapes (for example, by forming at least one of the length, width, and/or depth gradient of the first expansion groove 240 and the second expansion groove 250 differently), the functions of different expansion valves can be performed through a single valve assembly.

In one embodiment, the first expansion groove 240 and the second expansion groove 250 may have the same shape. In this case, the first expansion groove 240 and the second expansion groove 250 may be formed symmetrically along the circumferential direction of the valve body 200 with respect to the body outlet 220. In other words, the lengths, widths, and depth gradients of the first expansion groove 240 and the second expansion groove 250 may be formed to be the same. The first expansion groove 240 and the second expansion groove 250 are formed in the same shape, so the function of two identical expansion valves can be performed through a single valve assembly.

Note that the shortest circumferential distance (or smallest circumferential angle) (see "L1" in FIG. 8) between the first expansion groove 240 and the second expansion groove 250 may be longer than the shortest circumferential distance (or smallest circumferential angle) (see "L2" in FIG. 9) between a pair of adjacent outlet ports (e.g., the second outlet port and the third outlet port) among the first outlet port 110 to the third outlet port 130.

In this way, the shortest circumferential distance between the first expansion groove 240 and the second expansion groove 250 is longer than the shortest circumferential distance between a pair of adjacent outlet ports (e.g., the second outlet port and the third outlet port), so that refrigerant can be expanded through the first expansion groove 240 and the second expansion groove 250 and simultaneously discharged through the second outlet port 120 and the third outlet port 130.

Note that a valve seat 140 and a valve support body 150 may be provided between the first outlet port 110 to the third outlet port 130 of the valve housing 100 and the valve body 200, respectively, and the first outlet port 110 to the third outlet port 130 may be fluidly connected to the body outlet 220 of the valve body 200 through the valve seats 140 and the valve support bodies 150.

The valve seat 140 is formed in a substantially circular plate shape with a hollow center. In other words, the valve seat 140 is shaped like a substantially circular plate with a hollow center. The valve seat 140 may be in contact with an outer surface of the valve body 200. The valve seat 140 may rotatably support the valve body 200. A support surface of the valve seat 140 facing the valve body 200 may be formed in a partial spherical shape corresponding to the valve body 200.

The valve support body 150 may be provided on a radially outer side of the valve seat 140 and may be formed in a substantially cylindrical shape with a hollow center. In an embodiment, the first, second and third outlet ports (110, 120, 130) may be formed in the valve support bodies 150, respectively.

In another embodiment, a valve seal 160 may be provided between the valve seat 140 and the valve support body 150. The valve seal 160 may prevent the working fluid from leaking between the valve seat 140 and the valve support body 150.

In an embodiment, the body outlet 220 may be permanently and fluidly connected to the inlet port 101 as the valve body 200 rotates. As the valve body 200 rotates, the body outlet 220 may be selectively and fluidly connected to one of the first, second and third outlet ports (110, 120, 130) and may also be selectively and fluidly connected simultaneously to two outlet ports (e.g., the second outlet port and the third outlet port) among the first outlet port 110 to the third outlet port 130 through the first expansion groove 240 and the second expansion groove 250.

Below, operations of the valve assembly according to the embodiment is described in detail with reference to the accompanying drawings.

FIGS. 9 to 12 are views illustrating operating states of the valve assembly according to the embodiment.

Referring to FIGS. 9 to 12, the valve assembly according to the embodiment can selectively operate in a first mode, a second mode, a third mode or a fourth mode, by rotating the valve body 200 in accordance with a selected operating mode of a heat pump system.

According to an embodiment, the heat pump system may include a plurality of refrigerant lines through which a working fluid (e.g., refrigerant) flows. For example, the plurality of refrigerant lines may include a refrigerant inflow line 400, a first refrigerant discharge line 410, a second refrigerant discharge line 420, and a third refrigerant discharge line 430.

The refrigerant inflow line 400 may be positioned below the valve housing 100 of the valve assembly. The refrigerant inflow line 400 may be fluidly connected to the body inlet 210 of the valve body 200 at all times through the inlet port 101 of the valve housing 100.

The first refrigerant discharge line 410 to the third refrigerant discharge line 430 may be fluidly connected to the first outlet port 110 to the third outlet port 130, respectively, and the first refrigerant discharge line 410 to the third refrigerant discharge line 430 may be sequentially arranged apart from each other at set angles (e.g., 120 degrees) along the circumference of the valve housing 100 of the valve assembly.

In other words, as the valve body 200 rotates, the body inlet 210 of the valve body 200 may be fluidly connected to the refrigerant inflow line 400 at all times, and the body outlet 220 of the valve body 200 may be selectively fluidly connected to the first refrigerant discharge line 410 to the third refrigerant discharge line 430 through the first outlet port 110 to the third outlet port 130.

The first mode may be a mode in which refrigerant flowing into the refrigerant inlet line is discharged to the first refrigerant discharge line 410, the second mode may be a mode in which refrigerant flowing into the refrigerant inlet line is discharged to the second refrigerant discharge line 420, the third mode may be a mode in which refrigerant flowing into the refrigerant inlet line is expanded and discharged to the second refrigerant discharge line 420 and the third refrigerant discharge line 430, and the fourth mode may be a mode in which refrigerant flowing into the refrigerant inlet line is discharged to the third refrigerant discharge line 430.

The first mode, the second mode, and the fourth mode may be modes of changing a discharge path of the refrigerant flowing into the valve assembly. The third mode is a mode in which the refrigerant flowing into the valve assembly is expanded and discharged in two directions, and in this case, the valve assembly can function as an expansion valve.

The first mode may refer to a state in which the valve body 200 is positioned at a reference position, the second mode may refer to a state in which the valve body 200 is rotated by a first set angle (e.g., 120 degrees) in a set direction (e.g., a clockwise direction) from the reference position, the third mode may refer to a state in which the valve body 200 is rotated by a second set angle (e.g., 180 degrees) in a set direction (e.g., a clockwise direction) from the reference position, and the fourth mode may refer to a state in which the valve body 200 is rotated by a third set angle (e.g., 240 degrees) in a set direction (e.g., a clockwise direction) from the reference position.

In this case, the second set angle may be greater than the first set angle, and the third set angle may be greater than the second set angle.

Figure 9:
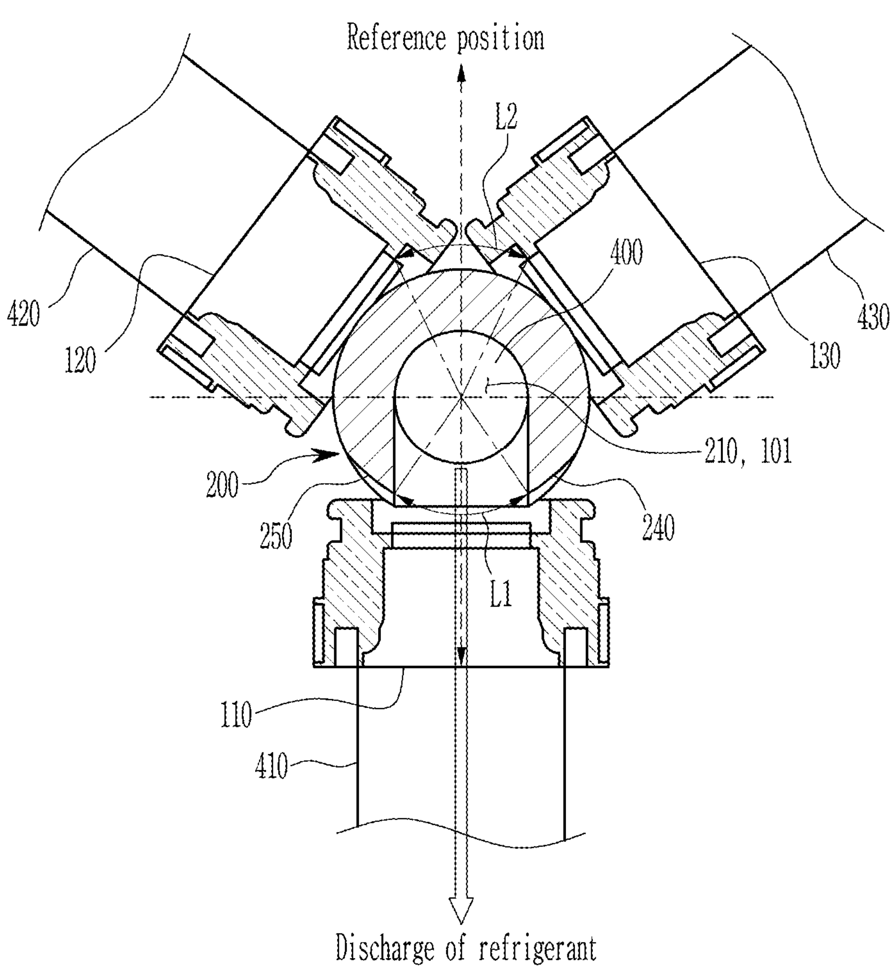
FIGS. 9 to 12 are views illustrating operating states of the valve assembly according to the embodiment.

Referring to FIG. 9, in the first mode in which the valve body 200 is positioned at the reference position, the body inlet 210 of the valve body 200 may be fluidly connected to the first outlet port 110 through a connecting line and the body outlet 220, and the refrigerant inflow line 400 may be fluidly connected to the first refrigerant discharge line 410 through the inlet port 101 of the valve housing 100, the body inlet 210, the connecting line, and the body outlet 220 of the valve body 200, and the first outlet port 110 of the valve housing 100.

In this case, the second outlet port 120 and the third outlet port 130 of the valve housing 100 may be blocked, and the second refrigerant discharge line 420 and the third refrigerant discharge line 430 may also be blocked.

Accordingly, the refrigerant flowing in through the refrigerant inflow line 400 may be discharged to the first refrigerant discharge line 410 through the inlet port 101 of the valve housing 100, the body inlet 210, the connecting flow passage 230, and the body outlet 220 of the valve body 200, and the first outlet port 110 of the valve housing 100.

Figure 10:
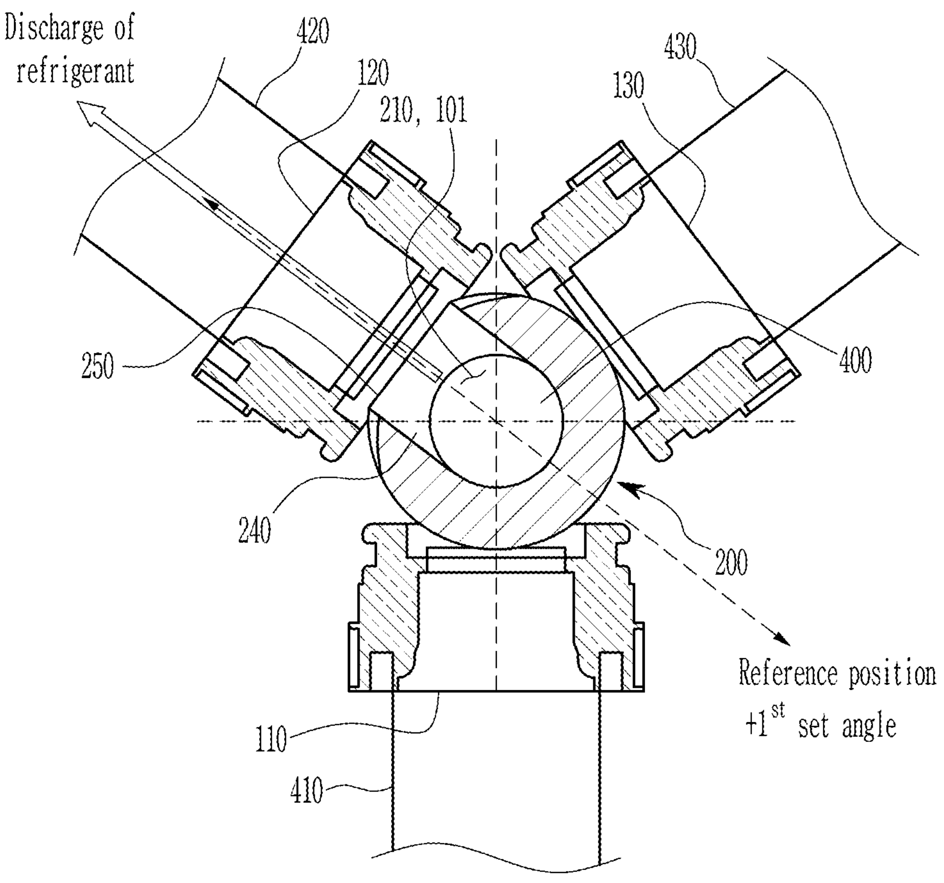

Referring to FIG. 10, in the second mode in which the valve body 200 is rotated by the first set angle (e.g., 120 degrees) in the set direction (e.g., a clockwise direction) from the reference position, the body inlet 210 of the valve body 200 may be fluidly connected to the second outlet port 120 through the connecting line and the body outlet 220, and the refrigerant inflow line 400 may be fluidly connected to the second refrigerant discharge line 420 through the inlet port 101 of the valve housing 100, the body inlet 210, the connecting line, and the body outlet 220 of the valve body 200, and the second outlet port 120 of the valve housing 100.

In this case, the first outlet port 110 and the third outlet port 130 of the valve housing 100 may be blocked, and the first refrigerant discharge line 410 and the third refrigerant discharge line 430 may also be blocked.

Accordingly, the refrigerant flowing in through the refrigerant inflow line 400 may be discharged to the second refrigerant discharge line 420 through the inlet port 101 of the valve housing 100, the body inlet 210, the connecting line, and the body outlet 220 of the valve body 200, and the second outlet port 120 of the valve housing 100.

Figure 11:
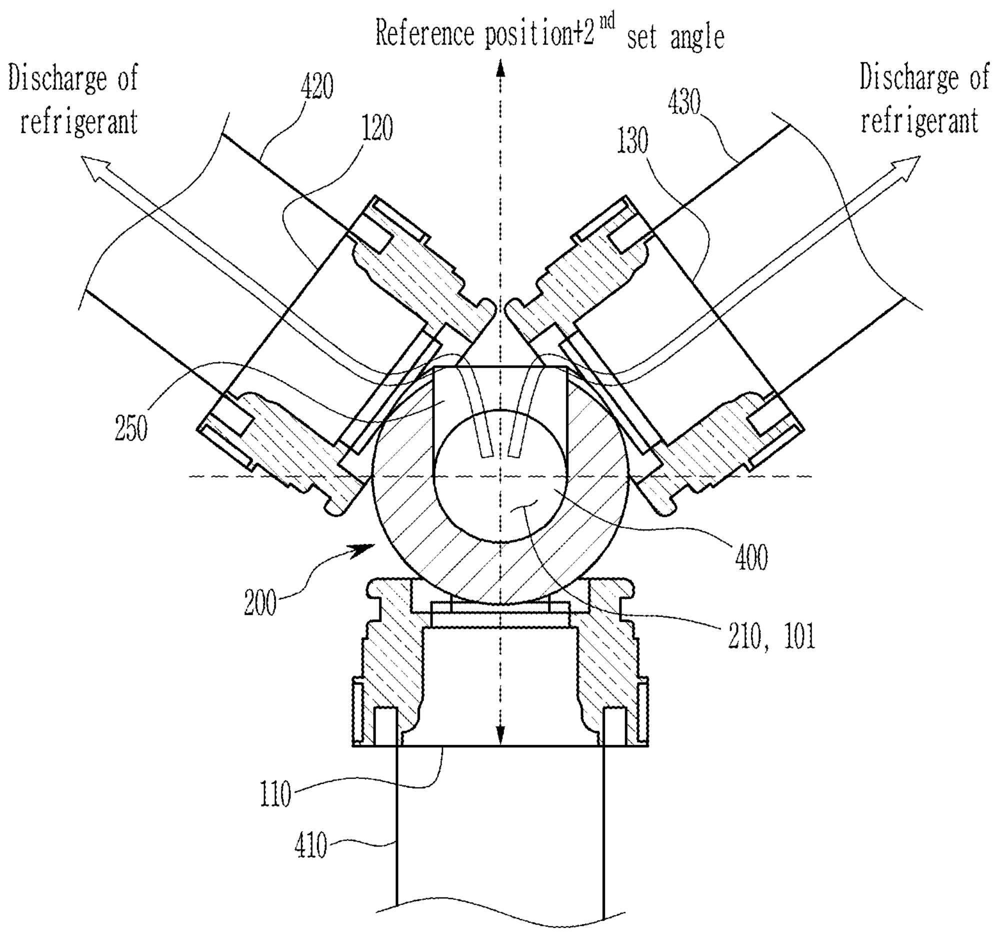

Referring to FIG. 11, in the third mode in which the valve body 200 is rotated by the second set angle (e.g., 180 degrees) in the set direction (e.g., a clockwise direction) from the reference position, the body inlet 210 of the valve body 200 may be fluidly connected to the second outlet port 120 through the connecting line, the body outlet 220, and the first expansion groove 240, and at the same time, the body inlet 210 of the valve body 200 may be fluidly connected to the third outlet port 130 through the connecting line, the body outlet 220, and the second expansion groove 250.

The refrigerant inflow line 400 may be fluidly connected to the second refrigerant discharge line 420 through the inlet port 101 of the valve housing 100, the body inlet 210, the connecting line, the body outlet 220, and the first expansion groove 240 of the valve body 200, and the second outlet port 120 of the valve housing 100, and at the same time, the refrigerant inflow line 400 may be fluidly connected to the third refrigerant discharge line 430 through the inlet port 101 of the valve housing 100, the body inlet 210, the connecting line, the body outlet 220, and the second expansion groove 250 of the valve body 200, and the third outlet port 130 of the valve housing 100.

In this case, the first outlet port 110 of the valve housing 100 may be blocked, and the first refrigerant discharge line 410 may also be blocked.

Accordingly, some of the refrigerant flowing in through the refrigerant inflow line 400 may be discharged to the second refrigerant discharge line 420 through the inlet port 101 of the valve housing 100, the body inlet 210, the connecting line, the body outlet 220, and the first expansion groove 240 of the valve body 200, and the second outlet port 120 of the valve housing 100. In this case, the refrigerant may be expanded while passing through the first expansion groove 240 and discharged to the second refrigerant discharge line 420.

At the same time, the remaining refrigerant flowing in through the refrigerant inflow line 400 may be discharged to the third refrigerant discharge line 430 through the inlet port 101 of the valve housing 100, the body inlet 210, the connecting line, the body outlet 220, and the second expansion groove 250 of the valve body 200, and the third outlet port 130 of the valve housing 100. In this case, the refrigerant may be expanded while passing through the second expansion groove 250 and discharged to the third refrigerant discharge line 430.

In this case, when the shapes of the first expansion groove 240 and the second expansion groove 250 are formed differently, a flow rate of the refrigerant expanded by the first expansion groove 240 and a flow rate of the refrigerant expanded by the second expansion groove 250 are different from each other. Accordingly, the flow rate of the refrigerant discharged through the second refrigerant discharge line 420 and the flow rate of the refrigerant discharged through the third refrigerant discharge line 430 can be controlled to be different.

This makes it possible to implement functions of two expansion valves with different specifications through a single valve assembly.

In addition, when the shapes of the first expansion groove 240 and the second expansion groove 250 are formed to be the same, the flow rate of the refrigerant expanded by the first expansion groove 240 and the flow rate of the refrigerant expanded by the second expansion groove 250 are the same. Accordingly, the flow rate of the refrigerant discharged through the second refrigerant discharge line 420 and the flow rate of the refrigerant discharged through the third refrigerant discharge line 430 can be controlled to be the same.

This makes it possible to implement functions of two expansion valves with the same specification through a single valve assembly.

Figure 12:
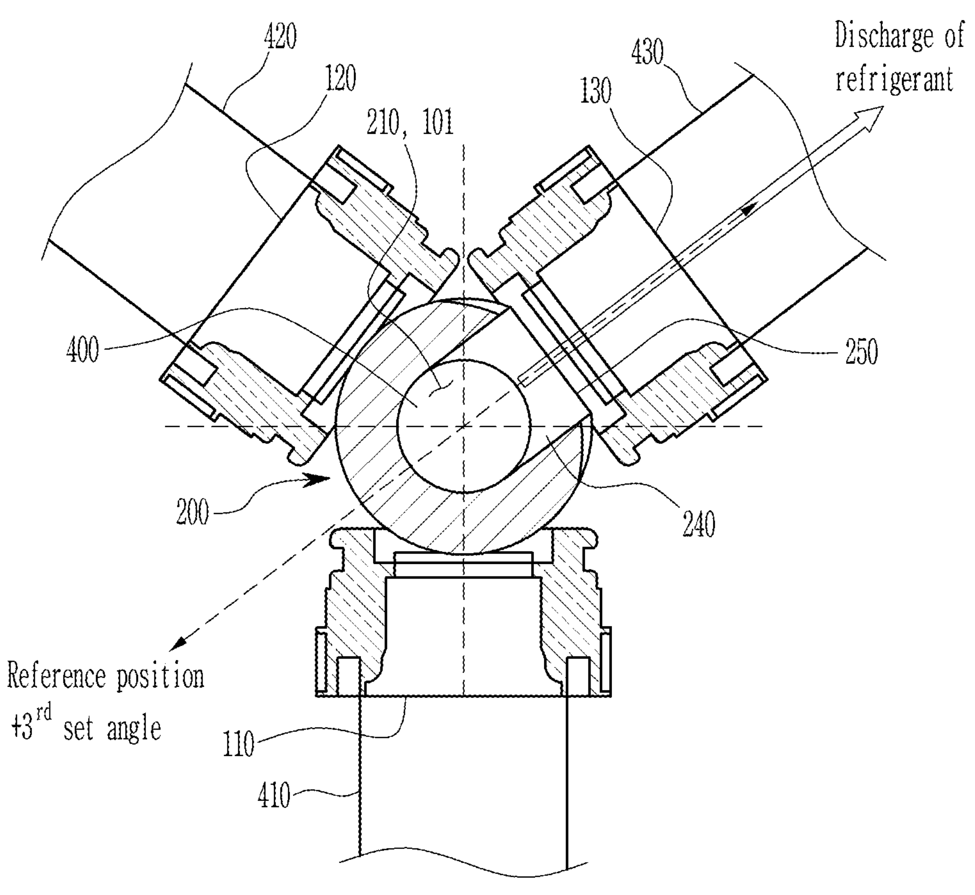

Referring to FIG. 12, in the fourth mode in which the valve body is rotated by the third set angle (e.g., 240 degrees) in the set direction (e.g., a clockwise direction) from the reference position, the body inlet 210 of the valve body 200 may be fluidly connected to the third outlet port 130 through the connecting line and the body outlet 220, and the refrigerant inflow line 400 may be fluidly connected to the third refrigerant discharge line 430 through the inlet port 101 of the valve housing 100, the body inlet 210, the connecting line, and the body outlet 220 of the valve body 200, and the third outlet port 130 of the valve housing 100.

In this case, the first outlet port 110 and the second outlet port 120 of the valve housing 100 may be blocked, and the first refrigerant discharge line 410 and the second refrigerant discharge line 420 may also be blocked.

Accordingly, the refrigerant flowing in through the refrigerant inflow line 400 may be discharged to the third refrigerant discharge line 430 through the inlet port 101 of the valve housing 100, the body inlet 210, the connecting line, and the body outlet 220 of the valve body 200, and the third outlet port 130 of the valve housing 100.

According to the valve assembly of the above-described embodiment, the functions of two expansion valves can be implemented through a single valve assembly, and accordingly, the structure of the heat pump system to which the valve assembly is applied can be simplified and the manufacturing cost can be reduced.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

100: valve housing
101: inlet port
110: first outlet port
120: second outlet port
130: third outlet port
140: valve seat
150: valve support body
160: valve seal
200: valve body
210: body inlet
220: body outlet
230: connecting flow passage
240: first expansion groove
250: second expansion groove
260: axial groove
300: drive unit
310: drive shaft
320: drive bracket
400: refrigerant inflow line
410: first refrigerant discharge line
420: second refrigerant discharge line
430: third refrigerant discharge line

What is claimed is:

1. A valve assembly comprising:

a valve housing including: an inlet port, a first outlet port, a second outlet port, and a third outlet port, wherein the first outlet port, the second outlet port and the third outlet port are formed along a circumference of the valve housing; and a valve body rotatably provided inside the valve housing and including:

a body inlet, a body outlet fluidly connected to the body inlet, and a first expansion groove and a second expansion groove, which are formed adjacent to the body outlet, wherein the body inlet and the inlet port are fluidly connected at all times, wherein the body outlet is selectively and fluidly connected to at least one of the first outlet port, the second outlet port or the third outlet port, and wherein the body outlet is selectively and fluidly connected simultaneously to two outlet ports, among the first outlet port, the second outlet port and the third outlet port, through the first expansion groove and the second expansion groove as the valve body rotates.

2. The valve assembly of claim 1, wherein:

a shortest circumferential distance between the first expansion groove and the second expansion groove is longer than a shortest circumferential distance between a pair of adjacent outlet ports among the first outlet port, the second outlet port and the third outlet port.

3. The valve assembly of claim 1, wherein:

the first expansion groove and the second expansion groove have different shapes from each other.

4. The valve assembly of claim 3, wherein:
at least one of lengths, widths, or depth gradients of the first expansion groove and the second expansion groove are formed differently from each other.

5. The valve assembly of claim 1, wherein:
the first expansion groove and the second expansion groove have the same shape.

6. The valve assembly of claim 5, wherein:
lengths, widths, and depth gradients of the first expansion groove and the second expansion groove are formed to be the same as each other.

7. The valve assembly of claim 1, wherein:
the body outlet is formed at a position perpendicular to the body inlet.

8. The valve assembly of claim 7, wherein:
the valve body is formed in a spherical shape, and
wherein a connecting flow passage configured to fluidly connect the body inlet and the body outlet is formed inside the valve body.

9. The valve assembly of claim 1, wherein:
the first outlet port, the second outlet port, and the third outlet port are formed at equal intervals along the circumference of the valve housing.

10. The valve assembly of claim 1, wherein:
a distance between any one pair of adjacent outlet ports, among the first outlet port, the second outlet port and the third outlet port, is shorter than a distance between each of the other two pairs of the first, second and third outlet ports.

11. The valve assembly of claim 1, further comprising:
valve seats each provided between the valve body and one of the first outlet port, the second outlet port and the third outlet port of the valve housing, the valve seats configured to rotatably support the valve body; and
a valve support body provided on a radially outer side of each of the valve seats.

12. The valve assembly of claim 11, further comprising:
a valve seal provided between each of the valve seats and the valve support body.

13. A heat pump system comprising:
a valve housing including: an inlet port, a first outlet port, a second outlet port, and a third outlet port, wherein the first outlet port, the second outlet port and the third outlet port are formed along a circumferential direction of the valve housing;
a valve body rotatably accommodated inside the valve housing and including:
a body inlet connected to the inlet port at all times,
a body outlet selectively connected to at least one of the first outlet port, the second outlet port or the third outlet port, and
a first expansion groove and a second expansion groove formed adjacent to the body outlet;
a refrigerant inflow line fluidly connected to the inlet port of the valve housing; and
a plurality of refrigerant discharge lines individually fluidly connected to at least one of the first outlet port, the second outlet port or the third outlet port of the valve housing, wherein the plurality of refrigerant discharge lines include a first refrigerant discharge line, a second refrigerant discharge line and a third refrigerant discharge line,
wherein the body inlet and the inlet port are fluidly connected to the refrigerant inflow line at all times, and
wherein the body outlet is selectively and fluidly connected to at least one of the first outlet port and the first refrigerant discharge line, the second outlet port and the second refrigerant discharge line, or the third outlet port and the third refrigerant discharge line.

14. The heat pump system of claim 13, wherein:
at least one of a first mode, a second mode, a third mode or a fourth mode is selectively operated as the valve body rotates,
wherein the first mode is a mode in which refrigerant flowing into the refrigerant inlet line is discharged to the first refrigerant discharge line,
wherein the second mode is a mode in which refrigerant flowing into the refrigerant inlet line is discharged to the second refrigerant discharge line,
wherein the third mode is a mode in which refrigerant flowing into the refrigerant inlet line is expanded and discharged to the second refrigerant discharge line and the third refrigerant discharge line, and
wherein the fourth mode is a mode in which refrigerant flowing into the refrigerant inlet line is discharged to the third refrigerant discharge line.

15. The heat pump system of claim 14, wherein:
the valve body is positioned at a reference position in the first mode,
the valve body is rotated by a first set angle in a set direction from the reference position in the second mode,
the valve body is rotated by a second set angle in the set direction from the reference position in the third mode, and
the valve body is rotated by a third set angle in the set direction from the reference position in the fourth mode.

16. The heat pump system of claim 15, wherein:
the second set angle is greater than the first set angle, and
wherein the third set angle is greater than the second set angle.

17. The heat pump system of claim 15, wherein:
in the first mode,
the refrigerant inflow line is fluidly connected to the first refrigerant discharge line through the inlet port, the body inlet, the body outlet, and the first outlet port, and
the refrigerant flowing in through the refrigerant inflow line is discharged to the first refrigerant discharge line.

18. The heat pump system of claim 15, wherein:
in the second mode,
the refrigerant inflow line is fluidly connected to the second refrigerant discharge line through the inlet port, the body inlet, the body outlet, and the second outlet port, and
the refrigerant flowing in through the refrigerant inflow line is discharged to the second refrigerant discharge line.

19. The heat pump system of claim 15, wherein:
in the third mode,
the refrigerant inflow line is fluidly connected to the second refrigerant discharge line through the inlet port, the body inlet, the body outlet, the first expansion groove, and the second outlet port,
the refrigerant inflow line is fluidly connected to the third refrigerant discharge line through the inlet port, the body inlet, the body outlet, the second expansion groove, and the third outlet port,
a portion of the refrigerant flowing in through the inflow line is expanded through the first expansion groove and discharged to the second refrigerant discharge line through the second outlet port, and
the remaining refrigerant flowing in through the inflow line is expanded through the second expansion groove and discharged to the third refrigerant discharge line through the third outlet port.

20. The heat pump system of claim 15, wherein:

in the fourth mode, the refrigerant inflow line is fluidly connected to the third refrigerant discharge line through the inlet port, the body inlet, the body outlet, and the third outlet port, and the refrigerant flowing in through the refrigerant inflow line is discharged to the third refrigerant discharge line.

* * * * *